(12) United States Patent
Shih et al.

(10) Patent No.: US 10,004,928 B2
(45) Date of Patent: Jun. 26, 2018

(54) LASER CUTTING AND ENGRAVING MACHINE HAVING FIRE SAFETY MECHANISM

(71) Applicant: GREAT COMPUTER CORPORATION, New Taipei (TW)

(72) Inventors: Liang Shih, New Taipei (TW); Tien-Chuan Huang, New Taipei (TW)

(73) Assignee: GREAT COMPUTER CORPORATION, New Taipei (TW)

( * ) Notice: Subject to any disclaimer, the term of this patent is extended or adjusted under 35 U.S.C. 154(b) by 362 days.

(21) Appl. No.: 14/844,683

(22) Filed: Sep. 3, 2015

(65) Prior Publication Data
US 2017/0065840 A1    Mar. 9, 2017

(51) Int. Cl.
| | |
|---|---|
| *B23K 26/38* | (2014.01) |
| *A62C 3/00* | (2006.01) |
| *A62C 37/44* | (2006.01) |
| *B23K 37/00* | (2006.01) |
| *B23K 26/70* | (2014.01) |
| *B23K 26/361* | (2014.01) |

(52) U.S. Cl.
CPC .............. *A62C 3/00* (2013.01); *A62C 37/44* (2013.01); *B23K 26/361* (2015.10); *B23K 26/38* (2013.01); *B23K 26/702* (2015.10); *B23K 37/006* (2013.01)

(58) Field of Classification Search
CPC ........ B23K 26/38; B23K 26/365; A62C 3/00; A62C 37/44
USPC .................................................. 219/50–162
See application file for complete search history.

(56) References Cited

U.S. PATENT DOCUMENTS

| | | | | |
|---|---|---|---|---|
| 3,878,352 A | * | 4/1975 | Inoue ..................... | B23H 11/00 219/69.14 |
| 4,505,194 A | * | 3/1985 | Bishop ................ | A47J 37/1228 454/49 |
| 4,578,555 A | * | 3/1986 | Inoue ....................... | B23H 7/20 219/69.19 |
| 5,767,481 A | * | 6/1998 | Graf .......................... | D21F 7/04 162/286 |
| 2003/0106880 A1 | * | 6/2003 | Lai ..................... | B23K 26/1435 219/121.6 |

* cited by examiner

*Primary Examiner* — Samuel M Heinrich
(74) *Attorney, Agent, or Firm* — Muncy, Geissler, Olds & Lowe, P.C.

(57) ABSTRACT

A laser cutting and engraving machine with a fire safety mechanism, comprising a machine body, a laser engraving mechanism provided in the machine body, and a work platform. The laser engraving mechanism is mounted on a work track and is movable along the work track to cut or engrave a workpiece provided on the work platform. The fire safety mechanism is provided in the machine body. The fire safety mechanism comprises a fire source sensing unit, a fire extinguishing unit, and a control unit, in which the control unit is electrically connected to the fire source sensing unit and the fire extinguishing unit, and it receives and processes a signal delivered from the fire source sensing unit to determine if the machine body is ignited and thereby controlling the activation of the fire extinguishing unit.

5 Claims, 2 Drawing Sheets

LASER CUTTING AND ENGRAVING MACHINE HAVING FIRE SAFETY MECHANISM

FIELD OF THE INVENTION

The present invention relates to a laser cutting and engraving machine with a fire safety mechanism, and more particularly to one provided with a fire safety mechanism to extinguish a fire when the machine is ignited.

BACKGROUND OF THE INVENTION

Since the laser engraving machine has advantages of wide applicability, high machining precision, and fast cutting, it has been widely used. The conventional laser engraving machine is mainly composed of a panel and a bottom base mutually abutted on and connected to form the body of the machine. The machine body is provided therein with a laser engraving mechanism, a platform for a workpiece, and an air-collecting bin, in which the air-collecting bin is placed beneath, abutted on and connected to the platform, and the laser engraving mechanism is provided on the platform, thereby the cutting crumbs and smoke generated in processing the workpiece on the platform by the laser engraving mechanism can be discharged from the air-collecting bin and out of an air outlet on the rear side of the air-collecting bin to endue the structure with an effect of removing cutting crumbs and heat.

Removing heat and cutting crumbs generated in laser processing and particularly generated in processing cloths and leathers of low ignition points being subject to combusting because of heat from cutting able to damage workpieces or even to induce fire alarms, causing significant damage to nearby machines and the whole plant due to the fire. However, most conventional laser cutting and engraving machines can not overcome the risk of inducing fire; thereby, when cutting materials with lower ignition points, danger is increased, and an improvement is anticipated.

SUMMARY OF THE INVENTION

Accordingly, in order to overcome the drawbacks described above so that when a workpiece in a laser cutting and engraving machine catches fire in processing, the fire extinguishing unit can be activated rapidly to extinguish fire to prevent fire spreading, the present application is provided by the inventors through years of experience, continuous development, research, and improvement.

The main object of the present invention is to provide a laser cutting and engraving machine with a fire safety mechanism, which comprises in the machine body a fire source sensing unit, a fire extinguishing unit, and control unit, wherein the control unit receives the sensing signal delivered from the fire source sensing unit and activates the fire extinguishing unit to extinguish fire if the sensing signal is larger than a predetermined parameter value.

To reach the object stated above, the laser cutting and engraving machine with a fire safety mechanism provided by the present invention comprises a machine body, a laser engraving mechanism provided in the machine body, and a work platform. The laser engraving mechanism is mounted on a work track and is movable along the work track to cut or engrave a workpiece provided on the work platform. The fire safety mechanism is provided in the machine body and comprises a fire source sensing unit, a fire extinguishing unit, and a control unit, wherein the control unit is electrically connected to the fire source sensing unit and the fire extinguishing unit and it receives and processes a signal delivered from the fire source sensing unit to determine if the machine body is ignited and then control the activation of the fire extinguishing unit.

In implementation, the fire source sensing unit is a smoke sensor, a specific wavelengths ray sensor, a flame sensor, or a specific gas sensor.

In implementation, the fire safety mechanism further comprises a warning unit producing light or sound.

In implementation, the fire extinguishing unit further comprises a position sensor and a deflection device, and the position sensor is for sensing the position of the laser cutting and engraving machine and the deflection device deflects the fire extinguishing unit according to the outcome of the position sensor.

In implementation, the fire extinguishing unit is a carbon dioxide fire extinguisher or a dry powder fire extinguisher.

In implementation, the control unit changes the determination condition corresponding to the material of the workpiece.

In order to make the present invention more comprehensible, the specific formation of and efficacy achieved by the present invention are described in detail below with reference to the preferred embodiments, the accompanying drawings, and reference numerals.

DETAILED DESCRIPTIONS OF PREFERRED EMBODIMENTS

Figure 1:
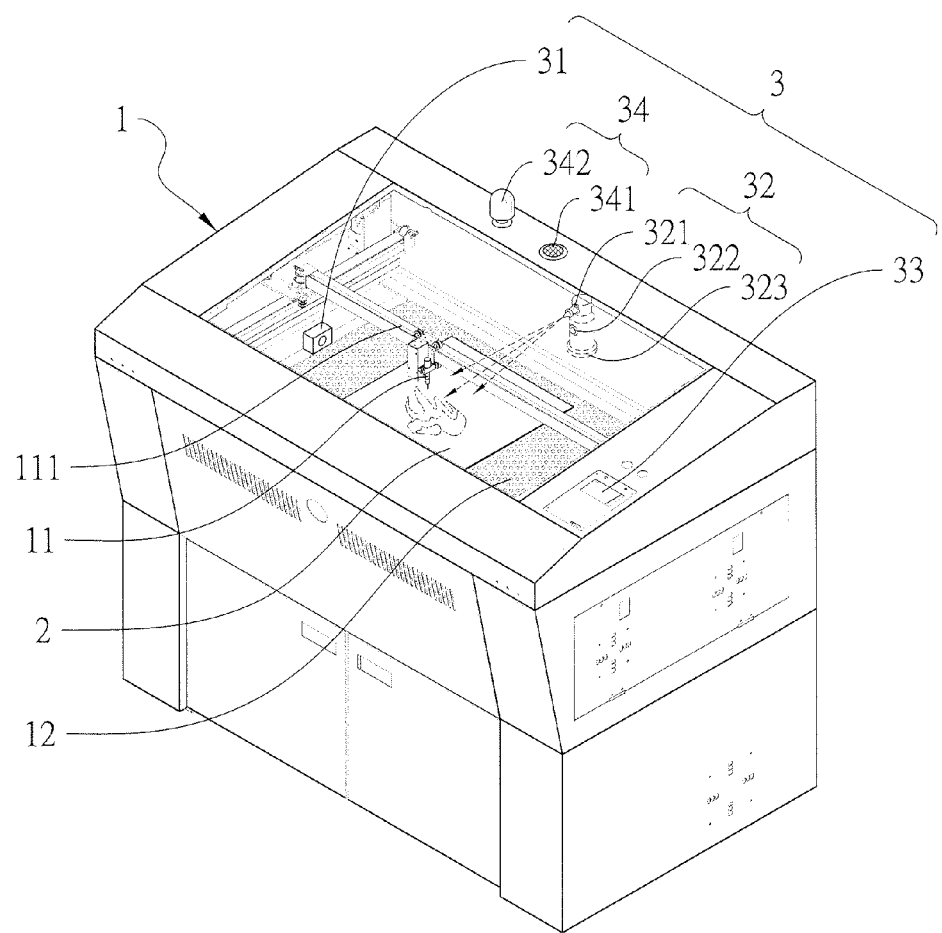
FIG. 1 is a schematic view showing the appearance of an embodiment of the laser cutting and engraving machine with a fire safety mechanism provided by the present invention.
Figure 2:
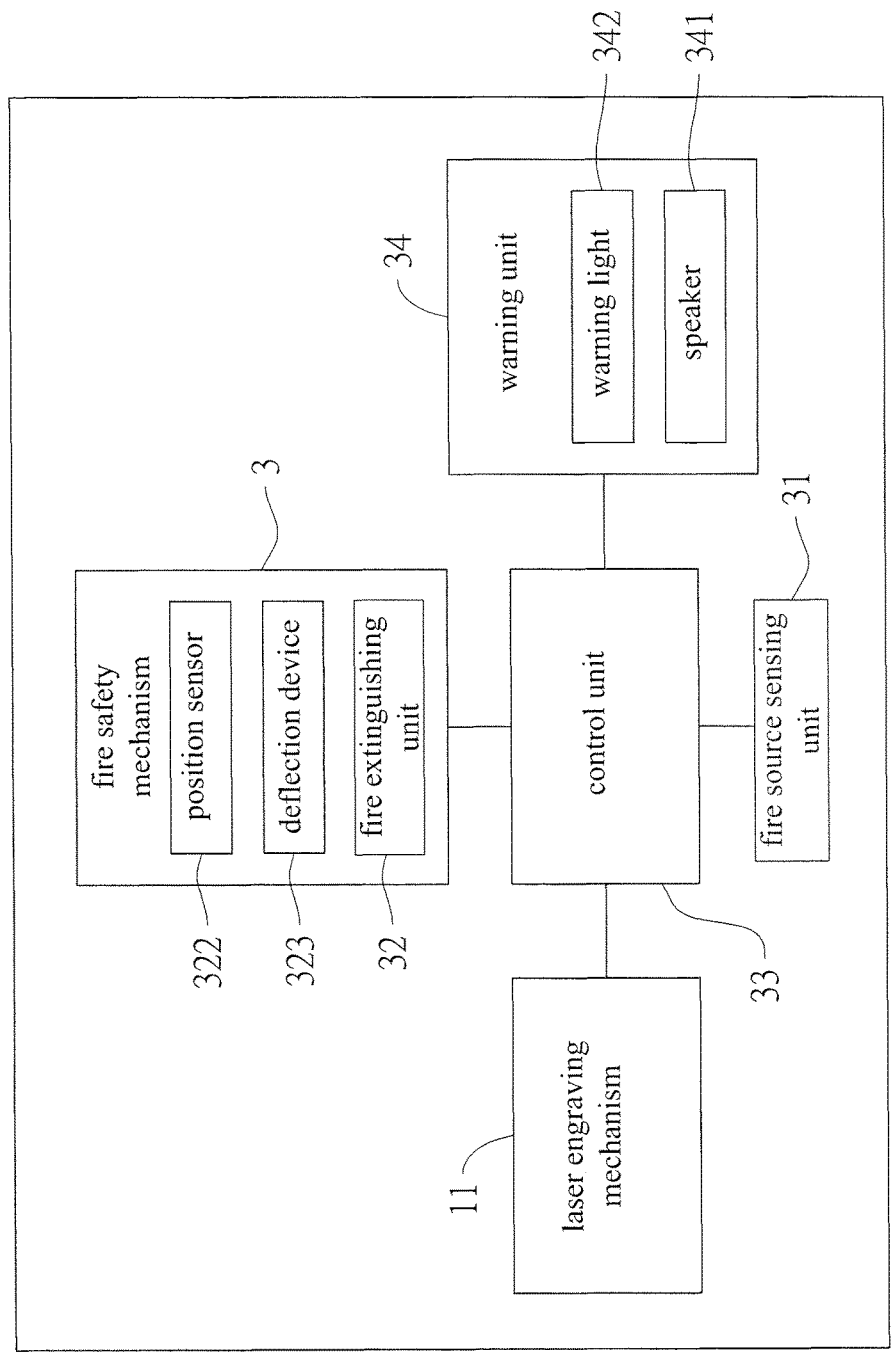
FIG. 2 is a schematic view showing the architecture of the embodiment of FIG. 1.

Please referring to FIGS. 1 and 2 showing an embodiment of the laser cutting and engraving machine with a fire safety mechanism of the present invention, which comprises a machine body 1, a laser engraving mechanism 11 provided in the machine body 1, a work platform 12, and a fire safety mechanism 3. The laser engraving mechanism 11 is mounted on a work track 111 and is movable along the work track 111 to cut or engrave a workpiece 2 provided on the work platform 12.

The fire safety mechanism 3 comprises a fire source sensing unit 31, a fire extinguishing unit 32, a control unit 33, and a warning unit 34, in which the fire source sensing unit 31 may be a smoke sensor for sensing the density of smoke, a specific wavelengths ray sensor for sensing ray of specific wavelengths (e.g., infrared ray or shortwave ultraviolet ray), a flame sensor for sensing flame, or specific gas sensor (e.g., carbon monoxide sensor).

The fire extinguishing unit 32 comprises an spray nozzle 321, a position sensor 322, a deflection device 323, and an air bottle provided in the fire extinguishing unit 32 and connected to the spray nozzle 321 (not shown in the figures). The position sensor 322 is for sensing the position of the laser cutting and engraving machine 11, and the sensed signal may be delivered to the deflection device 323, such that the deflection device 323 deflects the fire extinguishing unit 32 according to the sensed signal of the position sensor 322 and then the spray nozzle 321 turns towards the position of the laser cutting and engraving machine 11. For example, the position sensor 322 may be a photoelectric sensor that is able to detect the position of the laser cutting and engraving machine 11 or a photoresistive sensor that is able to detect the reflecting element provided on the laser cutting and engraving machine 11. Moreover, the fire extinguishing unit 32 may be a carbon dioxide fire extinguisher or a dry powder fire extinguisher, and the air bottle may store carbon dioxide, ABC dry powder, or any other fire-resistant substance known in the art.

The control unit 33 is electrically connected to the fire source sensing unit 31 and the fire extinguishing unit 32 to receive the signal delivered from the fire source sensing unit 31 and to control the activation of the fire extinguishing unit 32. The control unit 33 includes a database (not shown in the figure). The database includes plural predetermined parameter values corresponding to the material properties of the workpiece for determining if the machine body is ignited.

The warning unit 34 comprises a speaker 341 and a warning light 342. The speaker 341 and the warning light 342 are electrically connected to the control unit 33, so that they are controlled by the control unit 33.

In one embodiment, the setting of the parameter value of the control unit 33 is first altered corresponding to the material of the workpiece 2, and the workpiece 2 is then placed on the work platform 12 and are laser processed by the laser cutting and engraving machine 11; meanwhile, the fire source sensing unit 31 keeps monitoring the circumstances of the work platform 12 and delivers the sensed signal to the control unit 33. The control unit 33 determines if the received sensed signal is larger than the predetermined parameter value in the database, such as if the sensed signal of the density of the smoke/carbon monoxide is larger than a predetermined safe density value, or if the sensed temperature is larger than a predetermined safe temperature. When the sensed signal value is larger than the predetermined parameter value of the workpiece 2, the control unit 33 determines that the condition of the monitored circumstance coincides with the condition of catching fire and right away delivers signals to drive the speaker 341 and the warning light 342 the warning unit 34 to produce sound and flash light, delivers signals to stop the operation of the laser cutting and engraving machine 11, and delivers control signals to the fire extinguishing unit 32 to make the deflection device 323 turn the spray nozzle 321 towards the laser cutting and engraving machine 11 according to the sensed signal from the position sensor 322 and then to spray the carbon monoxide or ABC dry powder in the air bottle, so as to warn the operator and to extinguish fire.

In another embodiment, the fire source sensing unit 31 is a flame sensor that is able to sense the ignition points, and the control unit 33 can control the deflection device 323 of the fire extinguishing unit 32 to turn the spray nozzle 321 towards the ignition points and control the spray nozzle 321 to spray the carbon monoxide or ABC dry powder on the ignition points to extinguish fire.

Therefore, the present invention has the following advantages:

1. The present invention can immediately trigger the warning light and warning sound to alert the operator when the machine catches fire while the machine is off or while the operator is away from the machine, and the fire safety mechanism can be activated in the mean time to extinguish fire in place to prevent fire spreading, and therefore the safety is improved.

2. The present invention can set different parameter value corresponding to the material properties of the workpiece, which is practical in application and can prevent unnecessary disaster and damage.

In view of the above, according to the aforementioned disclosure, the present invention surely can achieve the expected objectives and provides a laser cutting and engraving machine with a fire safety mechanism which has simple structure and improved safety and practicality, which is very industrially applicable. Thus, the application for a patent is filed according to the law.

What is claimed is:

1. A laser cutting and engraving machine with a fire safety mechanism, comprising a machine body, a laser engraving mechanism provided in the machine body, and a work platform, the laser engraving mechanism mounted on a work track and movable along the work track to cut or engrave a workpiece provided on the work platform; the laser cutting and engraving machine characterized in that:
   the fire safety mechanism is provided in the machine body, and the fire safety mechanism comprises a fire source sensing unit, a fire extinguishing unit, and a control unit, wherein the control unit is electrically connected to the fire source sensing unit and the fire extinguishing unit, and it receives and processes a signal delivered from the fire source sensing unit to determine if the machine body is ignited and thereby controlling the activation of the fire extinguishing unit; and
   wherein the fire extinguishing unit further comprises a position sensor and a deflection device, and the position sensor is for sensing the position of the laser cutting and engraving machine and the deflection device deflects the fire extinguishing unit according to the outcome of the position sensor.

2. The laser cutting and engraving machine according to claim 1, wherein the fire source sensing unit is a smoke sensor, a specific wavelengths ray sensor, a flame sensor, or a specific gas sensor.

3. The laser cutting and engraving machine according to claim 1, wherein the fire safety mechanism further comprises a warning unit producing light or sound, and the warning unit is electrically connected to the control unit for being controlled by the control unit.

4. The laser cutting and engraving machine according to claim 1, wherein the fire extinguishing unit is a carbon dioxide fire extinguisher or a dry powder fire extinguisher.

5. The laser cutting and engraving machine according to claim 1, wherein the control unit changes the determination condition corresponding to the material of the workpiece.

* * * * *